United States Patent [19]

Oosawa et al.

[11] Patent Number: 4,939,024

[45] Date of Patent: Jul. 3, 1990

[54] RADIOWAVE ABSORBING BODY OF THE HIGH ELECTRICAL POWER-RESISTANT TYPE

[75] Inventors: Shigeru Oosawa, Sanda Atsugi; Haruyuki Yoshigahara, Minamiyana Hatano; Toshio Yukuta, Hase Kamakura, all of Japan

[73] Assignee: Grace Japan Kabushiki Kaisha, Tokyo, Japan

[21] Appl. No.: 349,015

[22] Filed: May 9, 1989

[30] Foreign Application Priority Data

May 27, 1988 [JP] Japan .................................. 63-128545

[51] Int. Cl.$^5$ ............................................... B32B 5/14
[52] U.S. Cl. .................................... 428/218; 428/224; 428/245; 428/284; 428/408; 428/703; 428/922
[58] Field of Search ............... 428/224, 245, 284, 408, 428/703, 922, 218

[56] References Cited

U.S. PATENT DOCUMENTS

| | | |
|---|---|---|
| 636,638 | 11/1899 | Cramer. |
| 3,941,918 | 3/1976 | Nigol et al. ........................ 174/140 |
| 4,111,710 | 9/1978 | Pairaudeau et al. ................ 106/90 |
| 4,240,840 | 12/1980 | Downing et al. .................... 106/93 |
| 4,301,356 | 11/1981 | Kogyo ................................ 219/213 |
| 4,302,414 | 11/1981 | Curnow et al. ..................... 264/137 |
| 4,408,255 | 10/1983 | Adkins ............................... 361/382 |
| 4,594,472 | 6/1986 | Brettle et al. ....................... 174/35 |
| 4,622,192 | 11/1986 | Ma ...................................... 264/136 |
| 4,678,699 | 7/1987 | Kritchevsky et al. ............. 428/175 |
| 4,778,718 | 10/1988 | Nicholls ............................. 428/703 |

Primary Examiner—James J. Bell
Attorney, Agent, or Firm—Kevin S. Lemack; William L. Baker

[57] ABSTRACT

A high electrical power-resistant radiowave absorbing body is disclosed comprising a carbon fiber fabric embedded in inorganic cement. The fabric can be woven or nonwoven. Carbon fiber fabrics of different densities can be used to develop a concentration gradient to enable wide frequency band absorption.

7 Claims, No Drawings

RADIOWAVE ABSORBING BODY OF THE HIGH ELECTRICAL POWER-RESISTANT TYPE

BACKGROUND OF THE INVENTION

This invention relates to a radiowave absorbing body which employs a carbon fiber nonwoven or woven fabric as a radiowave absorbing material, the fabric being sealed in a body of inorganic cement.

Conventional radiowave absorbing bodies usually comprise a body of a foamed polyurethane cut into a quadrangular pyramid shape or other various shapes, the body being impregnated with a liquid having carbon dispersed therein, the body thus impregnated being subjected to a drying treatment. Although they are excellent radiowave absorbing bodies which are lightweight and are good in operability, they suffer from various disadvantages such as the following ones: (1) The foamed polyurethane is too low in heat resistance to be used for the radiowave absorbing body for high density energy. Therefore, when the body absorbs the high energy and is heated, it cannot withstand the temperature of such a self-heating. (2) There is a risk that upon absorbing the high energy, the absorbing body gives out a smell and a smoke and is ignited. (3) Regardless of whether the absorbing body is used in the high density energy application or a general application, it is liable to absorb rain water and is less weatherproof, so that limitations are imposed on its outdoor use.

An object of this invention is to provide a radiowave absorbing body which eliminates the above-mentioned drawbacks of the prior art.

DETAILED DESCRIPTION OF THE INVENTION

The inventors of the present invention have made an extensive study and found out that a molded product, obtained by placing a carbon fiber nonwoven or woven fabric in a mold of a desired shape, then pouring inorganic cement thereinto and setting the cement, serves as an excellent radiowave absorbing body which achieves the above-mentioned object of the present invention.

According to the present invention, there is provided a radiowave absorbing body which comprises a carbon fiber nonwoven or woven fabric (hereinafter referred to as "carbon fiber fabric") embedded in a body of inorganic cement.

When a carbon fiber fabric is used alone as a radiowave absorbing material, it is possible that it is burnt at elevated temperatures. With the radiowave absorbing body according to the present invention, however, the carbon fiber fabric is embedded in the inorganic cement body which has a relatively good thermal conductivity, is incombustible and bulky, so that the carbon fiber fabric, even when heated, can be easily cooled. And besides, the oxygen is shut off by the cement, so that the oxidation is prevented. Therefore, the absorbing body is useful not only in the high density energy application but also in the general application.

The radiowave absorbing body according to the present invention is non-combustible as a whole since the carbon fiber fabric is completely sealed in the inorganic cement body. In adition, since the outer surface is defined by the inorganic cement, the absorbing body can well withstand an outdoor use.

It is considered that the radiowave absorbing body can be formed by embedding a carbon fiber fabric in a body made of a heat-resistant polymer such as a polyimide resin, a bismaleimide triazine resin, a silicone resin and a polycarbodiimide resin. With such a construction, however, the polymer body cannot be expected to be fully incombustible since it is made of an organic material. In addition, it is not fully durable when used outdoors.

Incidentally, recently, structures comprising carbon fiber chop strands dispersed in cement have been used in the construction of buildings. Such structures are different from the construction of the present invention and aim at increasing the mechanical strength of a wall of a multi-storied building per unit volume.

The radiowave absorbing material of th radio absorbing body itself need to be heat-resistant. Where the radiowave absorbing body comprises carbon powder bound by an organic binder, the carbon particles, upon absorbing high energy, are heated, though the carbon itself is heat-resistant, so that the organic binder is subjected to pyrolysis. As a result, the conditions of contact between the carbon particles vary, which gives rise to the difficulty that the absorbing body is lowered in performance as a whole.

According to the present invention, by virtue of the use of the carbon fiber fabric as the radiowave absorbing material, this difficulty is overcome. More specifically, the carbon fiber fabric, though it is a fibrous nonwoven fabric, is far greater in size than the carbon particles and is heated upon absorbing radiowaves of the high energy, so that the heat thus generated is transferred to the material surrounding it and is dissipated. At this time, since the carbon fiber fabric is bonded by the inorganic cement, the performance of the absorbing body will not be lowered even if a small amount of organic substances are present around the carbon fibers which organic substances are inevitably present because of the inherent structure of the nonwoven or woven fabric.

Where carbon fiber chop strands, similar to those used for a wall of a multi-storied building as mentioned above, are used instead of the carbon fiber fabric, the carbon content varies due to irregularities in a thickness of the molded product. In addition, when pouring cement, the chop strands are embedded in the cement in such a manner that they are oriented to have directional properties. For these reasons, such a construction is unsatisfactory in the radio absorbing ability.

From a microscopic point of view, the carbon fiber nonwoven fabric does not possess directional properties because of its radiowave-absorbing characteristics. On the other hand, on microscopic observations of the carbon fiber woven fabric, the fibers have directional properties. Therefore, where the latter is to be used, some arrangements are desired. For example, a plurality of fabrics are arranged at different angles, or the fabric is woven in such a manner that it does not have directional properties on a microscopic basis.

As the carbon fiber fabric, there can be used any of commercially available ones made of known carbon fibers, for example, of the polyacrylonitrile type or the pitch type. Either one or a plurality of such fabrics are used.

Further, in the present invention, the use of the carbon fiber fabric advantageously facilitates the control of the absorbing characteristics of the radiowave absorbing body. For example, to obtain an excellent radiowave absorbing ability, carbon fiber fabrics of different densities (hence, different radiowave absorbing abilities) can be used in combination. Particularly, the fabrics can be arranged in such a manner that a concentration gradient of the carbon fibers develops from the outer portion (i.e., the surface to which radiowaves are applied), thereby enabling a wide frequency band absorption.

It is considered that a radiowave absorbing body can be formed by sealing carbon powder in a body of inorganic cement. In this case, however, when the amount of the carbon powder is increased to obtain high energy absorbing characteristics, the strength of the inorganic cement body is markedly reduced. In addition, because of irregularities in the thickness of the cement, the radiowave absorbing characteristics become irregular, so that when the absorbing body is used for absorbing high energy, it is susceptible to a localized heating.

The inorganic cement referred to here in the present invention generally means an inorganic adhesive. Its examples are Portland cement, white cement, strength-improved Portland cement (for example, Dencit Binder manufactured by ADECA K.K.), water glass and gypsum. Other preferred examples are air-setting cement, hydraulic cement, alumina cement, blast furnace cement, silica cement, flasheye cement, slug cement, water glass cement, acid-resistant cement and dental cement.

Although the shape of the radiowave absorbing body is not limited, conventional shapes such as a quadrangular pyramid shape are usually used. However, to alleviate an increased weight due to the use of the inorganic cement, it is preferred that the absorbing body should be of a hollow construction particularly when it has a large size.

When manufacturing the radiowave absorbing body according to the present invention, alkali-resistant glass fibers, sand, small stones, a concrete blending agent, alkali-resistant glass fiber chop strands, etc., may of course be incorporated into the inorganic cement for reinforcing purposes. Also, various other components which are ordinarily used in concrete and mortar, such as a coloring agent and concrete additives, may be added.

Further, a support means, made, for example, of the same inorganic cement as that constituting the inorganic cement body of the radiowave absorbing body, may be formed on the base of the radiowave absorbing body so as to mount it on a wall, a ceiling or a floor of a radiowave dark room.

The invention will now be specifically illustrated by way of the following Examples:

EXAMPLE 1

A carbon fiber woven fabric A (15 g/m$^2$) was set on an inner surface of a concave (female) mold of a quadrangular pyramid shape, and then a binder mixture composed of the following components was introduced thereto:

| | |
|---|---|
| Portland cement | 100 parts |
| Water | 40 parts |
| Concrete blending agent | 1 part |
| Sand | 50 parts |

Separately, a carbon fiber woven fabric B (30 g/m$^2$) had been set on an outer surface of a convex (male) mold of a quadrangular pyramid shape. The convex mold was inserted into the concave mold. Upon lapse of 24 hours at a temperature of 30° C., the molds were removed, to obtain a radiowave absorbing body having the carbon fiber woven fabric A sealed in a hollow inorganic cement body of a quadrangular pyramid shape and embedded near an outer surface thereof and also having the carbon fiber woven fabric B sealed in the inorganic cement body and embedded near an inner surface of the inorganic cement body.

EXAMPLE 2

A carbon fiber nonwoven fabric having a density of 15 g/m$^2$ was prepared by bonding carbon fiber chop strands of a size of 3 mm onto a surface of an alkali-resistant glass net in a random fashion. A hollow radiowave absorbing body of a quadrangular pyramid shape was prepared according to the same procedure of Example 1 except that the above-mentioned nonwoven fabric was used instead of the carbon fiber woven fabric A and that a binder mixture of the following component was used:

| | |
|---|---|
| Dencit binder | 100 parts |
| Water | 30 parts |
| Alkali-resistant glass chop strand (3 mm) | 1 part |

EXAMPLE 3

Placed flatwise on a carbon fiber woven fabric (15 g/m$^2$) of which lengthwise concentration was equal to its widthwide concentration was an identical carbon fiber fabric which was displaced 45 degrees with respect to the first-mentioned woven fabric. Except that the thus combined carbon fiber woven fabric having a density of 30 g/m$^2$ was used instead of the carbon fiber woven fabric B and that a binder mixture of the following components was used, a hollow radiowave absorbing body of a quadrangular pyramid shape was prepared according to the same procedure of Example 1:

| | |
|---|---|
| White cement | 100 parts |
| Water | 30 parts |
| Concrete blending agent | 2 parts |

TEST EXAMPLE

The radiowave absorbing characteristics of the radiowave absorbing bodies of the above Examples were measured. The results obtained are shown in Table below.

| Frequency (GHz) | Absorbing Ability (dB) | | |
|---|---|---|---|
| | Example 1 | Example 2 | Example 3 |
| 1 | 32 | 32 | 32 |
| 3 | 25 | 35 | 35 |
| 10 | 40 | 39 | 42 |

Without the provision of any particular cooling means, the radiowave absorbing body of each Example withstood a situation where radiowaves having a frequency of 2350 MHz and a power density of 3 W/cm$^2$ were applied thereto for 30 minutes.

We claim:

1. A radiowave absorbing body comprising a plurality of carbon fiber fabrics arranged so as to form a concentration gradient of the carbon fibers in said body.

2. The radiowave absorbing body of claim 1 wherein at least one of the layers of the carbon fiber fabrics is woven.

3. The radiowave absorbing body of claim 1 wherein at least one of the layers of the carbon fiber fabrics is nonwoven.

4. The radiowave absorbing body of claim 1 wherein the carbon fiber fabrics comprise polyacrylonitrile.

5. The radiowave absorbing body of claim 1 having a quadrangular pyramid shape.

6. The radiowave absorbing body of claim 1 wherein said carbon fiber fabrics are embedded in inorganic cement.

7. The radiowave absorbing body of claim 1 wherein said plurality of layers comprises at least two layers of different densities.

* * * * *